Oct. 6, 1970 C. A. STEVENS 3,532,992

SCREENED SPEED LIGHT CONTROLLER AND PULSATOR

Filed April 26, 1968 3 Sheets-Sheet 1

INVENTOR.
CARL A. STEVENS

C. E. Vautrain Jr., Agent

INVENTOR.
CARL A. STEVENS

SCREENED SPEED LIGHT CONTROLLER AND PULSATOR

Filed April 26, 1968

INVENTOR.
CARL A. STEVENS

United States Patent Office 3,532,992
Patented Oct. 6, 1970

3,532,992
SCREENED SPEED LIGHT CONTROLLER AND PULSATOR

Carl A. Stevens, Winchester, Mass., assignor to the United States of America as represented by the Secretary of the Navy

Filed Apr. 26, 1968, Ser. No. 724,344
Int. Cl. H03k *1/16*
U.S. Cl. 328—38 8 Claims

ABSTRACT OF THE DISCLOSURE

The disclosed invention presents a solid-state controller-pulsator adapted to generate without moving parts a voltage versus time pulse train for the control of a screened speed light. A transistorized astable multivibrator base frequency generator and solid-state counting stages and solid-state logic switching circuitry comprise the timing unit. A manually operated multiposition switch provides for selection of the required switching wave trains for control of the speed light. A solid-state gate controlled switch is used to turn the speed light ON and OFF in response to the control pulse train. The system is fully automatic and is operational over a temperature range of from −60° F. to +130° F.

The invention described herein may be manufactured and used by or for the Government of the United States of America for governmental purposes without the payment of any royalities thereon or therefor.

This invention relates to an improved speed indicating device for vessels or other vehicles and, in particular, to a solid-state controller and pulsator for controlling a shipboard speed light.

Controllers and pulsators for screened speed lights conventionally have used mechanically timed switching for generating pulses of light which represent the desired ahead or astern speeds. Such control units must generate a periodic voltage amplitude pulse type wave in real time and necessitate a reference time base which can be accomplished by a variety of methods: mechanical, thermal, chemical, electronic or combinations of these. Regardless of the method used, the time base is either generated internally, e.g. by a clock mechanism, or applied from an external source such as the rotor speed of an electric drive motor.

In a solid-state device for generating and shaping a monotonic voltage pulse versus time wave train, or switching sequence, an appropriate time base must be generated, and in this case, an astable transistorized multivibrator has been found to be a desirable substitute. Such a multivibrator is susceptible to temperature compensation to obtain the required environmental accuracy and stability.

The present invention thus provides a solid-state controller and pulsator which includes an astable multivibrator for generating a rectangular voltage amplitude versus time pulse train whose pulse width and repetition rate are set by the values of resistance and capacitance in the RC or timer section of the circuit. Deletion or blanking of specific pulses is achieved through logic circuits consisting of counting and gate sections. The astable multivibrator used is operated at a high harmonic frequency of the base frequency, which harmonic frequency is then divided down by a counting system to obtain the required base frequency. Four specific and different pulse time values are achieved by changing circuit components via a multiposition, multiwafer selector switch. Following the astable generator is an eighteen-stage counter and logic system which is used to count down the generator frequency, allow the desired number of pulses to pass on to the driver stage, blank the number of undesired pulses for the particular speed setting in use, shut off the pulse signal at the end of the required six-second repetition period and reset and start again the timing cycle.

The output of the logic system controls a solid-state transistorized amplifier-driver stage. This stage amplifies the control signal from the logic to a level ensuring reliable switching of the gate control circuit. The multiposition selector switch has ten wafer sections, each wafer section identifying the terminals and connections to the frequency generator, counters, logic gate control switch and red and white lamps of the speed light. For the two reverse speeds, the switching sequencies of the ⅓ and ⅔ speed ahead are switched to the red lamps in the speed light by using two additional switching positions.

Accordingly, it is an object of the present invention to provide a solid-state controller and pulsator for a screened speed light including components necessary for the generation and shaping of a monotonic voltage versus time train for the control of the screened speed light.

Another object of the invention is to provide a solid-state controller and pulsator for a screened speed light using the output of a logic system to control a solid-state transistorized amplifier-driver stage.

A further object of the present invention is to provide a solid-state control and pulsator for a screen speed light which incorporates selected sequencies of a multistage counter and logic system for counting down generator frequencies.

Other objects, advantages and novel features of the invention will become apparent from the following detailed description thereof when considered in conjunction with the accompanying drawings in which like numerals represent like parts throughout and wherein.

Figures 1, 2:
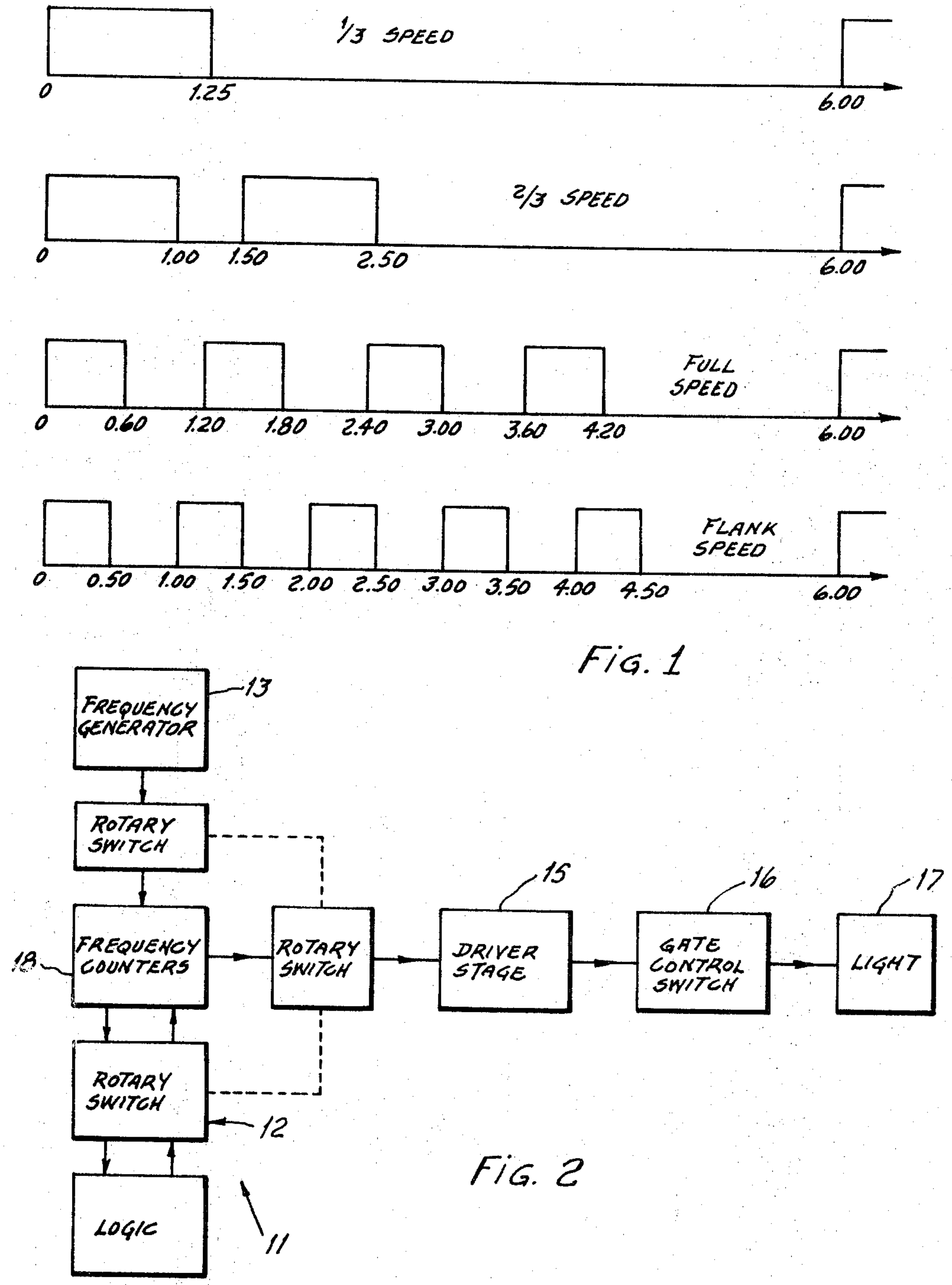
FIG. 1 is a schematic presentation of the four voltage versus time waves required to represent four speeds.
FIG. 2 is a block diagram of the system.

Referring to FIG. 1, voltage versus time waves required for various speeds are shown, those for ⅔ and full speed being modified from the standard duration times of pulses utilized in the past by mechanically-timed equipment. Each speed signal is completed in a period of 6 seconds, so that for ⅓ speed a 1.25-second pulse is followed by a 4.75 blank to form the signal. For ⅔ speed, a 1-second pulse followed by a 0.50-second blank followed by a 1-second pulse followed by a 3.5-second blank, forms the signal. For full speed and flank speed, the pulse periods are 0.6 of a second and 0.5 of a second, respectively, the short blanks are 0.6 of a second and 0.5 of a second also and the major blanks are 1.8 seconds and 1.5 seconds, respectively.

In FIG. 2, the block diagram identifies the components and their arrangement in the system for providing a full spectrum of speed signals. An eighteen-stage counter and logic system, 11 including a multiposition selector switch 12, follows an astable generator 13 and counts down the generator frequency allowing the desired number of pulses to pass on to a driver stage 15. The counter and logic system also blanks the common undesired pulses for a particular speed setting, shuts off the pulse signal at the end of the 6-second repetition period and resets and starts again the timing cycle. The output of the logic system controls amplifier-driver stage 15, while this stage amplifies the control signal from the logic to a level ensuring reliable switching of a gate control switch 16. The driver stage also acts as a buffer to isolate and prevent interaction on the logic by the gate control switch. The solid-state gate control switch 16 turns on and off a 115-volt electrical source to energize the lamps in a speed light 17. Switch 12 has separate wafer sections for the terminals and connections to frequency generator 13, frequency counters 18, gate control switch 16 and the red and white lamps, not shown, of light 17.

Figure 3:
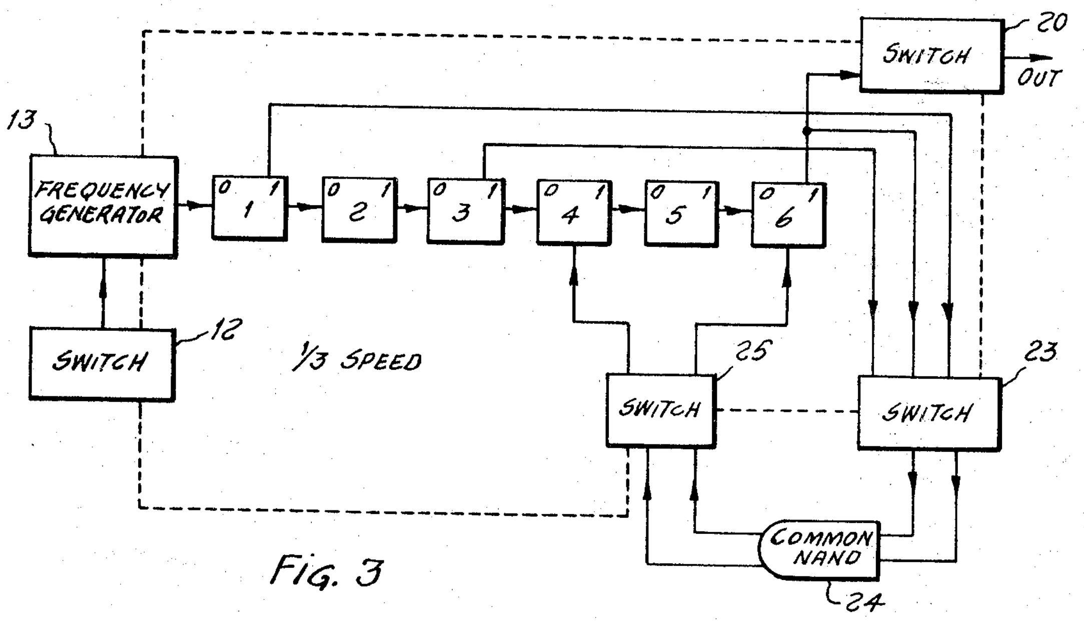
FIG. 3 is a block diagram of the components used to generate the waveform for ⅓ speed.

FIG. 3 shows how the ⅓ speed wave form is generated using the first six bistables of the counter unit. The count is a normal binary count using the pulses corresponding to 001101 and proceeding through to 100100 as set forth in Table 1.

TABLE 1.—BINARY COUNT FOR ⅓ SPEED

| | Counter | | | | | | |
|---|---|---|---|---|---|---|---|
| | 6 | 5 | 4 | 3 | 2 | 1 | |
| No output for 4.75 sec | 0 | 0 | 1 | 1 | 0 | 1 | Start. |
| | 0 | 0 | 1 | 1 | 1 | 0 | |
| | 0 | 0 | 1 | 1 | 1 | 1 | |
| | 0 | 1 | 0 | 0 | 0 | 0 | |
| | 0 | 1 | 0 | 0 | 0 | 1 | |
| | 0 | 1 | 0 | 0 | 1 | 0 | |
| | 0 | 1 | 0 | 0 | 1 | 1 | |
| | 0 | 1 | 0 | 1 | 0 | 0 | |
| | 0 | 1 | 0 | 1 | 0 | 1 | |
| | 0 | 1 | 0 | 1 | 1 | 0 | |
| | 0 | 1 | 0 | 1 | 1 | 1 | |
| | 0 | 1 | 1 | 0 | 0 | 0 | |
| | 0 | 1 | 1 | 0 | 0 | 1 | |
| | 0 | 1 | 1 | 0 | 1 | 0 | |
| | 0 | 1 | 1 | 0 | 1 | 1 | |
| | 0 | 1 | 1 | 1 | 0 | 0 | |
| | 0 | 1 | 1 | 1 | 0 | 1 | |
| | 0 | 1 | 1 | 1 | 1 | 0 | |
| | 0 | 1 | 1 | 1 | 1 | 1 | |
| | 1 | 0 | 0 | 0 | 0 | 0 | |
| utput for 1.25 sec | 1 | 0 | 0 | 0 | 0 | 1 | |
| | 1 | 0 | 0 | 0 | 1 | 0 | |
| | 1 | 0 | 0 | 0 | 1 | 1 | |
| | 1 | 0 | 0 | 1 | 0 | 0 | |
| | 1 | 0 | 0 | 1 | 0 | 1 | Detect and reset to start. |

The counter counts down to the 13th pulse at the start at which time the speed light is controlled and is off so long as the 6th stage is at zero. The light remains off from the 13th pulse to the 32nd pulse which pulse sets stage 6 to one thereby closing a switch 20 and energizing the speed light lamp, not shown. The OFF condition continues for 4.75 seconds, generator 13 supplying pulses of 0.25-second duration for this speed setting. The speed light lamp remains energized as long as the 6th stage is on one, this lasting until the 37th pulse or for 1.25 seconds. Pulse 37 resets stage 1 to one, stage 2 remains at zero and stage 3 remains at one and resets stage 4 to one via the combined signals from stages 1, 3 and 6 through switch 23 and common NAND 24. When all of these stages are in the one position, common NAND 24 resets stage 6 to zero and stage 4 to one through switch 25. These resettings reproduce the count at pulse 13 thereby turning off the light and causing it to remain off until pulse 32 again is reached.

Figure 4:
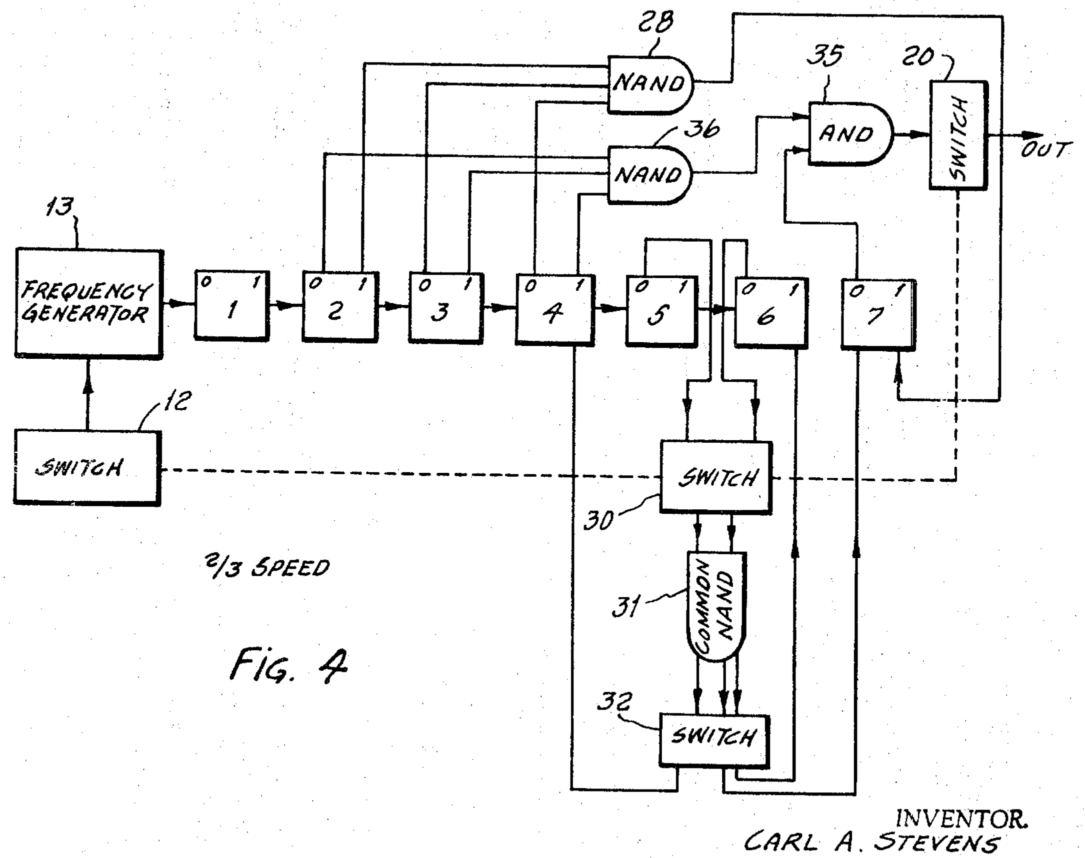
FIG. 4 is a block diagram of the components used to generate the wave form for ⅔ speed.

The ⅔-speed wave form is generated as shown in FIG. 4 by using the 2nd through the 6th bistables of the counter, a 7th bistable not triggered from the 6th bistable, and associated logic. The count is a normal binary count using the pulses corresponding to 0001010 and proceeding through to 0000001 as set forth in Table 2.

TABLE 2.—BINARY COUNT FOR ⅔ SPEED

| | Counter | | | | | | |
|---|---|---|---|---|---|---|---|
| | '7' | 6 | 5 | 4 | 3 | 2 | |
| Output | '0' | 1 | 0 | 1 | 0 | 0 | Start. |
| 1 sec | '0' | 1 | 0 | 1 | 0 | 1 | |
| No output 0.5 sec | '0' | 1 | 0 | 1 | 1 | 0 | |
| Output 1 sec | '0' | 1 | 0 | 1 | 1 | 1 | |
| | '0' | 1 | 1 | 0 | 0 | 0 | |
| No output 3.5 sec | '1' | 1 | 1 | 0 | 0 | 1 | |
| | '1' | 1 | 1 | 0 | 1 | 0 | |
| | '1' | 1 | 1 | 0 | 1 | 1 | |
| | '1' | 1 | 1 | 1 | 0 | 0 | |
| | '1' | 1 | 1 | 1 | 0 | 1 | |
| | '1' | 1 | 1 | 1 | 1 | 0 | |
| | '1' | 1 | 1 | 1 | 1 | 1 | |
| | '0' | 0 | 0 | 0 | 0 | 0 | Detect and reset to start. |

A NAND gate 28 for stages 2, 3 and 4 operates so that when inputs are received from these stages as indicated, stage 7 is set to one thereby turning the light to the OFF condition. One circumstance for turning the light to the ON condition is a zero output from stage 7 while the other condition is when stages 2, 3 and 4 are at zero, one and one, respectively. When the counter is started, the first pulse will provide zero settings at the 5th and 6th stages. In this condition, zeros at stages 5 and 6 are fed through a switch 30 to NAND 31 and a switch 32 causing stages 4 and 6 to be set at one and stage 7 to be set at zero. This condition of the counter corresponds to the 40th pulse and therefore the counter immediately switches from the 1st pulse to the 40th and starts the sequence of control pulses which is shown in Table 2. At the 40th pulse, one condition for ON occurs when there is no input into AND gate 35 from NAND gate 36 and the other condition is no output from stage 7. Since these conditions are satisfied at the 40th pulse, the light is in the ON condition at this pulse. The light remains on until the 44th pulse, or a period of 1 second at a frequency of 0.25 of a second per pulse. At the 44th pulse, the conditions for energizing NAND 36 are met and a negative pulse is passed shutting off the light. At the 46th pulse, only two of the three conditions necessary for energizing NAND 36 are present thus there is no output from NAND 36 and the light is turned on. At the 50th pulse, the conditions for energizing NAND 28 exist so that an output signal is generated which sets the 7th stage from zero to one thereby shutting off the light. The light remains off until the 64th pulse at the occurrence of which the counter is reset to the 40th pulse by shifting stage 4 to one and stage 6 to one through the presence of zero settings at stages 5 and 6. At this time stage 7 also is shifted to zero thereby returning the light to the ON condition.

Figure 5:
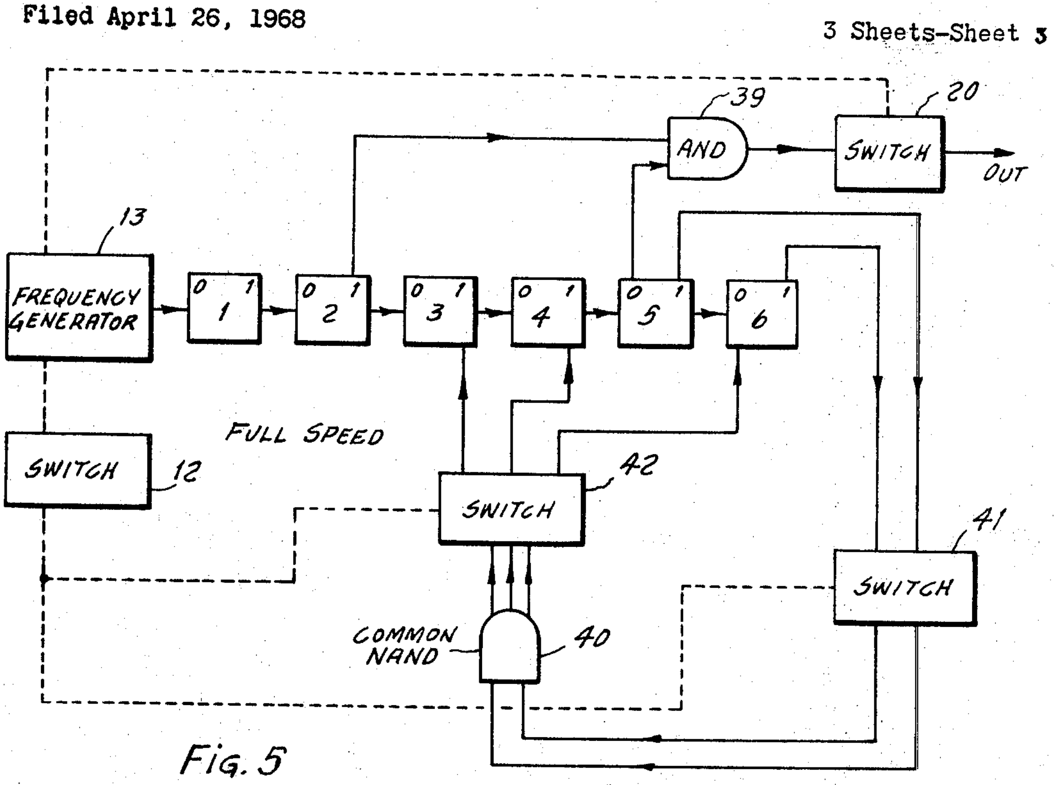
FIG. 5 is a block diagram of the components used to generate the wave form for full speed.

Control for FULL SPEED is obtained primarily through stages 2 and 5 when in the one and zero condition, respectively, as shown in FIG. 5. The count again is a normal binary count using the pulses corresponding to 001110 and proceeding through to 000011 as set forth in Table 3.

TABLE 3.—BINARY COUNT FOR FULL SPEED

| | Counter | | | | | |
|---|---|---|---|---|---|---|
| | 6 | 5 | 4 | 3 | 2 | |
| Start | 0 | 1 | 1 | 1 | 0 | No output 1.8 scs. (rows 1–3) |
| | 0 | 1 | 1 | 1 | 1 | |
| | 1 | 0 | 0 | 0 | 0 | |
| | 1 | 0 | 0 | 0 | 1 | Output 0.6 sec. |
| | 1 | 0 | 0 | 1 | 0 | No output 0.6 sec. |
| | 1 | 0 | 0 | 1 | 1 | Output 0.6 sec. |
| | 1 | 0 | 1 | 0 | 0 | No output 0.6 sec. |
| | 1 | 0 | 1 | 0 | 1 | Output 0.6 sec. |
| | 1 | 0 | 1 | 1 | 0 | No output 0.6 sec. |
| | 1 | 0 | 1 | 1 | 1 | Output 0.6 sec. |
| | 1 | 1 | 0 | 0 | 0 | Detect and reset to start. |

Stage 1 is not used for full speed. The counter counts down to pulse 28 at which time the system is set in operation in the OFF condition since there are no inputs into AND gate 39. The system remains OFF until the 34th pulse at which time a setting of one at stage 2 and zero at stage 5 will cause an output signal from AND 39 to close switch 20 and turn on the light. With stage 5 at zero and stage 6 at one for the next several pulses, the light is switched off and on by stage 2 as this stage reciprocates between zero and one settings. That is, stage 2 is alternately in the ON and OFF condition every second pulse thereby forming a series of pulse signals, four in total number, until pulse 48 is reached. Pulse 48 sets stages 2, 3 and 4 to zero and stage 5 to one and, since stage 6 is at one, a common NAND 40 operated through a switch 41 resets stage 6 to zero, stage 4 to one and stage 3 to one through another switch 42 thereby returning the counter to the settings existing at pulse 28 and restarting the cycle.

Figure 6:
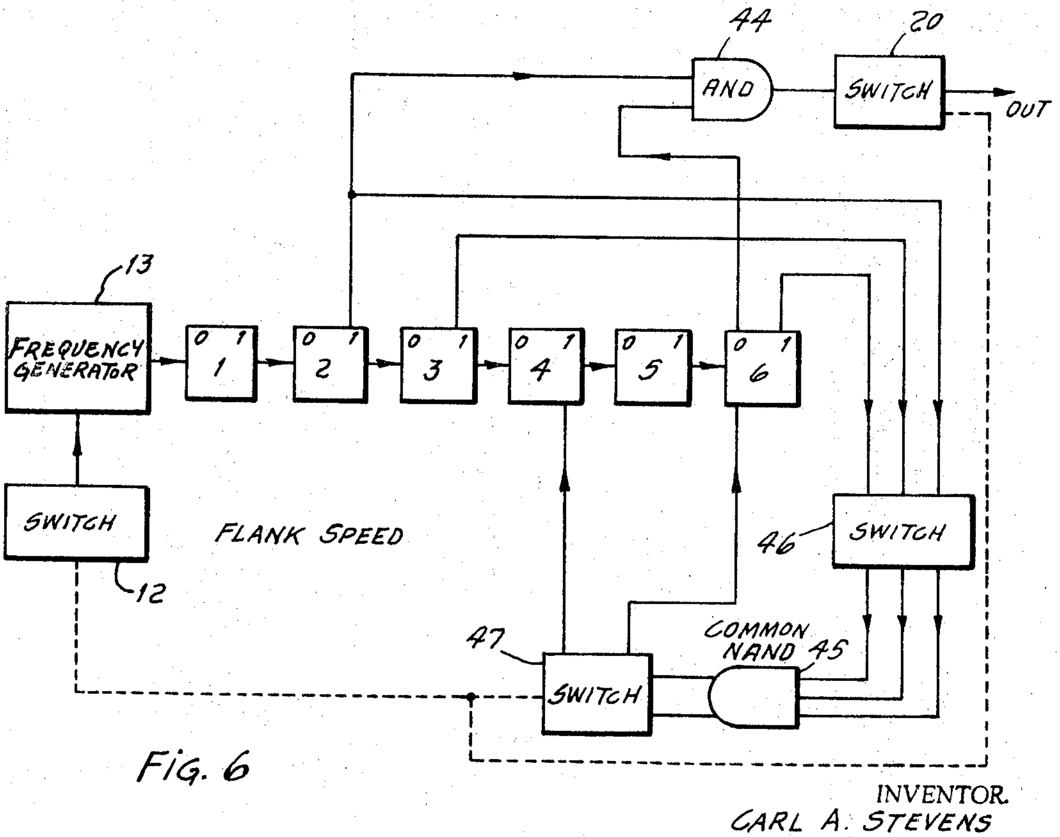
FIG. 6 is a block diagram of the components used to generate the waveform for flank speed.

For FLANK SPEED, the circuit for which is shown in FIG. 6, stages 1 and 5 are not used and the cycle is initiated at the 14th pulse of the counter. The count again is a normal binary count using the pulses corresponding to 011100 and proceeding through to 011001 as set forth in Table 4.

TABLE 4.—BINARY COUNT FOR FLANK SPEED

| | Counter | | | | | | |
|---|---|---|---|---|---|---|---|
| | 6 | 5 | 4 | 3 | 2 | 1 | |
| Output | 0 | 0 | 1 | 1 | 1 | 0 | Start. |
| 0.5 sec | 0 | 0 | 1 | 1 | 1 | 1 | |
| No output | 0 | 1 | 0 | 0 | 0 | 0 | |
| 0.5 sec | 0 | 1 | 0 | 0 | 0 | 1 | |
| Output | 0 | 1 | 0 | 0 | 1 | 0 | |
| 0.5 sec | 0 | 1 | 0 | 0 | 1 | 1 | |
| No output | 0 | 1 | 0 | 1 | 0 | 0 | |
| 0.5 sec | 0 | 1 | 0 | 1 | 0 | 1 | |
| Output | 0 | 1 | 0 | 1 | 1 | 0 | |
| 0.5 sec | 0 | 1 | 0 | 1 | 1 | 1 | |
| No output | 0 | 1 | 1 | 0 | 0 | 0 | |
| 0.5 sec | 0 | 1 | 1 | 0 | 0 | 1 | |
| Output | 0 | 1 | 1 | 0 | 1 | 0 | |
| 0.5 sec | 0 | 1 | 1 | 0 | 1 | 1 | |
| No output | 0 | 1 | 1 | 1 | 0 | 0 | |
| 0.5 sec | 0 | 1 | 1 | 1 | 0 | 1 | |
| Output | 0 | 1 | 1 | 1 | 1 | 0 | |
| 0.5 sec | 0 | 1 | 1 | 1 | 1 | 1 | |
| No output 1.5 sec | 1 | 0 | 0 | 0 | 0 | 0 | |
| | 1 | 0 | 0 | 0 | 0 | 1 | |
| | 1 | 0 | 0 | 0 | 1 | 0 | |
| | 1 | 0 | 0 | 0 | 1 | 1 | |
| | 1 | 0 | 0 | 1 | 0 | 0 | |
| | 1 | 0 | 0 | 1 | 0 | 1 | |
| | 1 | 0 | 0 | 1 | 1 | 0 | Detect and reset to start. |

The 14th pulse starts the cycle with the light in the OFF condition since the required inputs into an AND gate 44, i.e. a one at stage 2 and a zero at stage 6, are not present. These inputs are provided by pulse 16 which pulse places the circuit in the ON condition. Thereafter, the circuit is switched reciprocably off, on, off etc. as the 2nd stage is changed to zero, one, zero etc., respectively. After five flashes, i.e. at the 32nd pulse, stage 6 is set to one thereby removing one of the requirements for the ON condition and establishing the OFF condition. The light remains off until the 38th pulse which pulse sets stage 2 to one and stage 3 to one, stage 6 remaining at one, the condition required to activate a common NAND 45 through a switch 46 to shift stage 4 to one and stage 6 to zero through a switch 47. With stages 4 and 6 so shifted, the counter is reset to the condition existing at pulse 14, starting the cycle over again.

The solid-state controller and pulsator provided in this invention is fully automatic and operational over a temperature range of from −60° F. to +130° F. It replaces a heavy and large mechanical switching device which vessels have been burdened with for decades. The timing of the pulses for ship speed is virtually the same as the timing which evolved over many years in determining the pulses and blanks for a conventional speed light. The solid-state components, however, provide for reliable, trouble-free performance, long life expectancy and economic feasibility.

The astable multivibrator is operated at a high harmonic frequency of the base frequency to avoid the severe restrictions on parameter temperature tolerances which would be encountered if the multivibrator were operated at the fundamental frequency of the pulse trains. The free-running astable multivibrator generates a continuously repetitive rectangular pulse-type voltage versus time wave train as illustrated in FIG. 1. The pulse duration time and repetition rate are determined essentially by the values of resistance and capacitance for a given speed. Multi-position, multiwafer selector switch 12 permits a selection of four different and speed pulse time values representing ⅓ speed, ⅔ speed, full speed and flank speed by changing circuit components in the multivibrator. For the two reverse speeds, the switching sequences of the ½-speed and ⅔-speed ahead signals are switched to the red lamps in the speed light by using two additional switching positions. These two positions, not shown, provide "back slow speed" and "back full speed" using the ⅓- and ⅔-speed switching sequences, respectively.

The various speed wave forms are generated by using the first six bistables of the counter unit. The count is a normal binary count starting at a selected setting for each speed using a concise section of the counter program. Countdown to start in most cases is avoided by connecting certain stages to NAND gates which reset other stages to the condition of a pulse which has been selected as the starting pulse for a given speed. Thus, the counter is operated in an abbreviated manner in that the cycles for each of the speeds are excerpted from the normal sequence of operation. The output frequency of astable generator 13 is changed in the generation of the full speed wave form to provide a pulse every 0.3 of a second for this speed only.

The device is adaptable to being assembled in a compact, watertight and relatively shockproof cabinet and should operate for long periods of time without malfunction. The starting time or stopping time of a particular pulse, or of an entire pulse sequence or any portion thereof, has been determined to be subject to a maximum deviation from the mean of less than two percent.

Obviously many modifications and variations of the present invention are possible in the light of the above teachings. It is therefore to be understood that within the scope of the appended claims the invention may be practiced otherwise than as specifically described.

What is claimed is:

1. A solid-state controller-pulsator for supplying controlled repetitive electric current pulse trains including blanks of varying intervals to selected equipment operating from a conventional power supply comprising:

an astable multivibrator for generating rectangular voltage amplitude versus time pulse control signals;

said multivibrator adapted to be operated at a high harmonic frequency of its base frequency;

means including a multistage counter and logic system for counting down said high harmonic frequency to said base frequency and blanking specific pulses;

a driver stage and switching means connected thereto and to said multivibrator and multistage counter and logic system means for amplifying said control signals; and control means connected intermediate said driver stage and said equipment for switching on and off the power from said power supply to said equipment in response to signals from said driver stage.

2. The device as defined in claim 1 wherein said multistage counter and logic system is adapted to allow the desired number of pulses to pass on to said driver stage, shut off the pulse train at the end of a selected repetition period, and reset and start again the timing cycle of pulses.

3. The device as defined in claim 2 wherein said multistage counter and logic system includes at least six bistable stages and the output signal is taken from at least one of said stages, said device further including switching means interconnecting selected bistable stages so as to start a cycle at a selected count of said counter, form the desired pulse train thereafter through consecutive counts and reset said counter to said selected count upon the occurrence of the count designating the end of said desired pulse train.

4. The device as defined in claim 3 wherein the equipment to be controlled is a speed light, the output signal to the driver stage for the ⅓ speed pulse train being taken from the 6th bistable stage, when said stage is at one, the blank for said pulse train occurring during counts of said counter wherein the 6th bistable stage is at zero, the bistable stages of said counter being interconnected so that the 6th stage is reset to zero after a pulse of selected duration has been passed, the counter being reset to the count identifying the start of said blank simultaneously with the resetting of said 6th stage to zero.

5. The device as defined in claim 3 wherein the equipment to be controlled is a speed light, the output signal to the driver stage for the ⅔-speed pulse train being obtained partly through a first NAND gate connected to at least two of said bistable stages and partly through a 7th bistable stage not triggered from the 6th bistable stage, said 7th bistable stage switched to one by a signal from a second NAND gate connected to at least two of said bistable stages, said 7th bistable stage switched to zero by the occurrence of a zero condition at at least one of said bistable stages other than those stages connected to said NAND gates.

6. The device as defined in claim 5 wherein an output signal to the driver stage occurs at the coincidence of a high voltage condition at said first NAND gate and a zero setting of said 7th stage, the pulse train being started by the first count of said counter setting the counter ahead to a count which is the initial count of a sequence which will produce two pulses of a selected duration separated by a blank of 0.5 said duration and followed by a blank produced through setting said 7th stage to one, said 7th stage reset to zero and said counter returned to the starting count of the pulse train by the final pulse of said sequence.

7. The device as defined in claim 3 wherein the equipment to be controlled is a speed light, the pulse train for full speed being started by a selected count of said counter initiating a sequence having a blank for a selected duration followed by a series of four pulses of ⅓ said duration, said series of pulses and blanks produced by the on-off operation of the 1st stage of said bistable stages, the final count of said sequence resetting said counter to the starting count of said sequence.

8. The device as defined in claim 3 wherein the equipment to be controlled is a speed light, the pulse train for flank speed being started by a selected count of said counter initiating a sequence of five pulses separated by four blanks all of equal duration produced by the on-off operation of the 1st stage of said bistable stages, the 5th of said pulses being followed by a blank of thrice said duration, said blank terminated by the final count of said sequence which final count resets said counter to the starting count of said sequence.

References Cited

UNITED STATES PATENTS

| | | | |
|---|---|---|---|
| 3,204,124 | 8/1965 | Durio | 307—271 XR |
| 3,250,923 | 5/1966 | Liska et al. | 307—271 XR |
| 3,304,434 | 2/1967 | Koster | 340—271 XR |
| 3,310,708 | 3/1967 | Seidler | 315—225 |
| 3,392,283 | 7/1968 | Tomek | 340—271 XR |

STANLEY T. KRAWCZEWICZ, Primary Examiner

U.S. Cl. X.R.

307—271; 315—225; 328—59; 340—271